Feb. 9, 1954

H. W. BEECHER 2,668,521

HEARTH TYPE FURNACE

Filed May 8, 1951

INVENTOR
*Henry W. Beecher*
BY
*J. P. Moran*
ATTORNEY

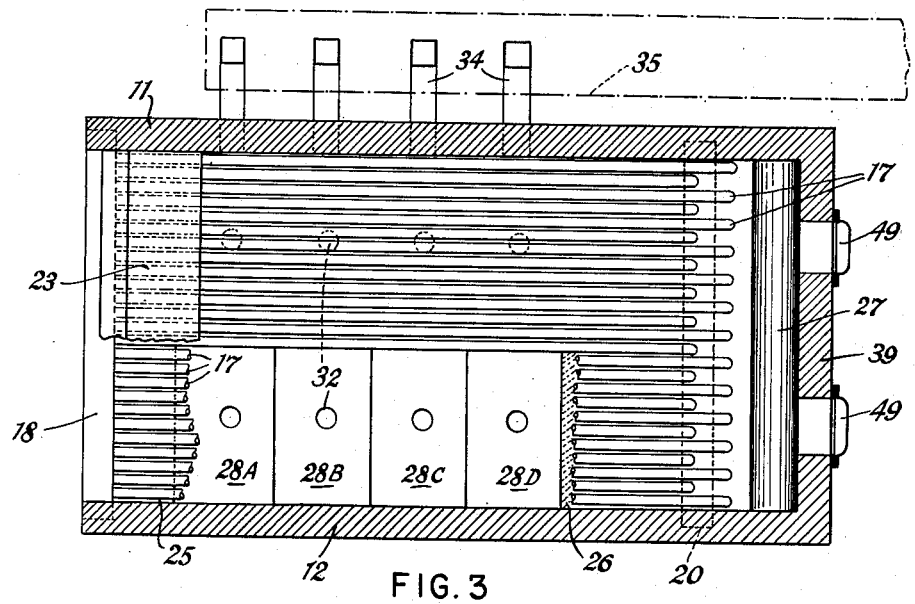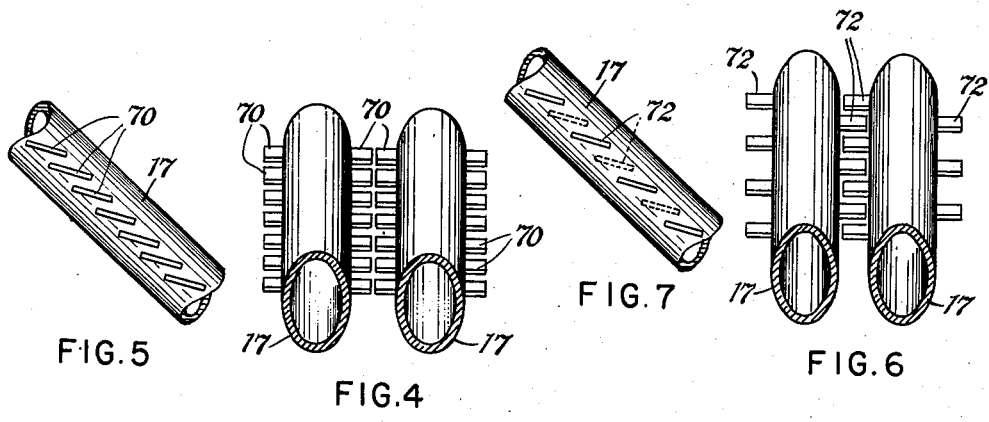

Patented Feb. 9, 1954

2,668,521

UNITED STATES PATENT OFFICE 2,668,521

HEARTH TYPE FURNACE

Henry W. Beecher, Seattle, Wash.; Blanche Cameron Beecher and Henry Ward Beecher, Jr., executors of said Henry W. Beecher, deceased Application May 8, 1951, Serial No. 225,078

2 Claims. (Cl. 122—2)

The present invention relates to furnaces, and more particularly to hearth type furnaces for the combustion of relatively high moisture fuels.

Many high moisture materials occurring naturally or resulting as by-products from manufacturing processes contain heat values which are difficult to recover by combustion due to the relatively high moisture associated therewith. Wood refuse is a typical example of this type of fuel and it occurs as a waste in an industry where the heat value in the waste is of economic interest when the heat can be usefully converted for the production of steam. In furnaces constructed for the combustion of high moisture fuels it has been customary to provide means for the addition of supplementary fuels to the furnace space. Fuel oil has been a popular supplementary fuel and has been used to supply heat to the associated steam generator when wood refuse is not available and also to supplement the heat obtained from burning wood refuse when high steam generating rates are desired. When fuel oil is burned in the furnace with the wood refuse, the heat radiated from the oil flame assists in maintaining efficient combustion conditions on the grate. When such furnaces are constructed and arranged for the supplementary fuel to be burned within the wood refuse furnace, the furnace walls are advantageously water cooled for protection against the high temperatures created therein. When the wet wood refuse is burned alone, such furnace wall surfaces are relatively cold and combustion may not be efficient.

In accordance with the present invention I provide a furnace construction wherein a major portion of the furnace walls are refractory faced, and heat reflecting surfaces are provided to assist in the self-sustaining, efficient combustion of the wood refuse. A supplementary fuel may be burned in a water cooled gas pass or auxiliary furnace associated with the wood refuse furnace in such a manner as to provide radiant heat for the wood burning on the hearth. With the furnace hereinafter described, self-sustaining combustion of the wood refuse is extended over an increased range of fuel moisture contents, at higher capacities and without a supplementary fuel. When a supplementary fuel is burned for higher steam generating capacities in the unit, or to assist in the combustion of fuel having unusually high moisture contents, the use of the high heat value fuel is not damaging to the wood refuse furnace.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 3 is a section view of the hearth taken on line 3—3 of Fig. 1;

Fig. 4 is a partial end elevation view of an alternate construction of the hearth;

Fig. 5 is a side view of the alternate construction shown in Fig. 4;

Fig. 6 is a partial end elevation view of another alternate construction of the hearth; and Fig. 7 is a side view of the hearth construction shown in Fig. 6.

Figures 1, 2:
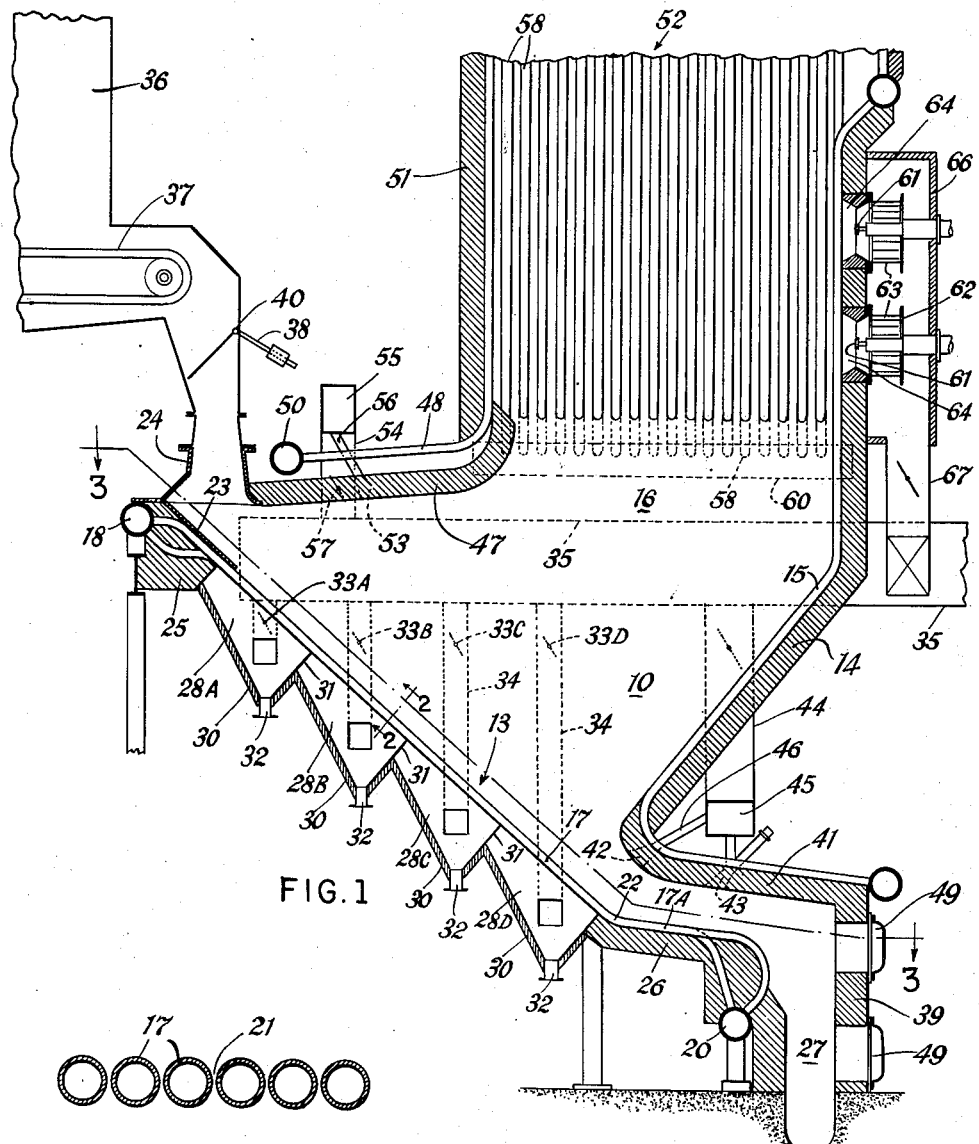
Fig. 1 is an elevation view, in section, of a hearth furnace constructed in accordance with the present invention.
Fig. 2 is a section view taken on line 2—2 of Fig. 1.

In the embodiment of the invention shown in the drawings, the hearth furnace is constructed and arranged for the combustion of wood refuse, and is associated with a conventional vapor generator with the heat values contained in the fuel usefully converted to vapor generation. It will be understood that the invention can readily be used for the combustion of other high moisture fuels and the heat released thereby can be used for other heating purposes. When other fuels are used, the angle of hearth inclination, as hereinafter described, may change with the different characteristics of such other high moisture fuels. As disclosed and claimed in my co-pending application Serial No. 112,907, filed August 29, 1949, a hearth inclination of 40° to 43°, with respect to the horizontal, cooperates with a high velocity combustion air flow through the hearth to cause a gravitational movement of the wood refuse fuel downwardly along the hearth.

Referring to Figs. 1, 2 and 3, the furnace 10 is defined by substantially upright refractory side walls 11 and 12, an inclined hearth 13, a rear wall 14 faced with a row of spaced tubes 15, and is provided with an upper combustion gas outlet 16.

The hearth 13 consists of a row of closely spaced tubes 17 opening to a header 18 at their upper end and to a header 20 at their lower end. Advantageously the headers 18 and 20 are connected into the circulatory system of a vapor generator, as disclosed in my said co-pending application. In the embodiment shown the tubes are of 3¼″ diameter and are spaced to provide an intertube dimension 21 of approximately ⅛″. The tubes extend downwardly in a co-planar row from a position spaced from the header 18 at an angle of 40° to 43° from the horizontal to a lower intermediate position, as at a bend 22, and thereafter in a generally horizontal direction and opening into the header 20. The upper end portion of the hearth is provided with a metallic dead plate 23, resting on the tubes 17 and joined to the edge of the fuel inlet member 24. Suitable refractory material 25 is positioned beneath the plate 23 and around the upper end portion of the tubes 17. The lower end portion 17a of the tubes 17 is likewise provided with supporting and sealing refractory material 26 extending from a location adjacent the bend 22 to a position defining one wall of an ash pit 27.

Modified forms of hearth construction are shown in Figs. 4, 5, 6 and 7. In Figs. 4 and 5, the row of tubes 17 is more widely spaced than in the arrangement shown in Fig. 2, and fingers 70 are welded on each tube to define a plurality of air flow ports through the intertube spaces. In the further modification of Figs. 6 and 7, the tubes 17 are also relatively widely spaced and fingers 72 are welded alternately on adjacent tubes in overlapping relationship. In both of the modified arrangements the total air flow area through the grate 13 is substantially equivalent to the total intertube spaces of the grate construction shown in Figs. 2 and 3, but in addition the construction is such as to direct the flow of air flow therethrough, at least in part, in a downward direction along the hearth 13.

To attain efficient combustion conditions with a high moisture fuel, such as described, the air admission through the hearth 13 and through the bed of fuel thereon is controlled as to both volume and pressure, in a series of zones. This is accomplished by the control of air flow into a series of separate air distributing boxes 28A, 28B, 28C and 28D positioned in adjoining relationship immediately beneath the tubes 17 of the hearth. In the embodiment shown, each box 28 extends transversely across the lateral extent of the hearth and is provided with a hopper bottom 30. A plate partition 31 separates the adjoining boxes so that air flow between the boxes is minimized. A valved outlet 32 is provided at spaced positions along the bottom 30 of each box for the periodic removal of any siftings collected therein from the fuel bed maintained on the hearth. Little, if any, siftings will be collected during wood burning operation of the furnace, although some fine particles of fuel will fall through the intertube spaces 21 during periods of reduced air flow, when the unit is placed in, or withdrawn from service.

The flow of air to each of the distributing boxes 28A to 28D is controlled by a damper 33 in the air conduits 34. Each of the conduits receives preheated air from a common source (not shown) through an air duct 35.

High moisture fuel is delivered to the upper end of the hearth 13 from a storage bin 36 at a controlled rate by a belt feeder 37. The fuel discharged by the feeder 37 falls onto a counterweighted leaf valve 38 which periodically pivots about an axle 40 to deliver a batch of fuel through the fuel inlet member 24. The fuel deposits on the dead plate 23 where it is preheated by radiation from the furnace and gravitates downwardly along the hearth 13 under the pressure of additional batches of new fuel and the effect of the air jets passing through the intertube spaces 21 of the hearth.

The rear wall 14 extends from an upper position defining one side of the outlet opening 16 in a downward direction and is inclined downwardly and forwardly in a plane generally perpendicular to the plane of the hearth 17 to a position spaced above the bend 22 in the row of hearth tubes 17. Thereafter the wall 14 extends rearwardly in a plane generally parallel to the lower end portion 17a of the tubes 17 merging with an upright wall 39 which defines one side of the ash pit 27. Doors 49 are provided in the wall 39 to provide means for access to the throat formed between the tube portions 17a and arch 41, and further, for the removal of ash from the pit 27.

In the embodiment shown in Fig. 1, the tubes 15 are positioned on the furnace side of the wall 14 for a substantial portion of their upper extent, but are located on the outside of the lower arch-like portion 41 of the rear wall. This arrangement provides a protective cooled surface for the upper portion of the wall, and further provides a heat reflective surface opposite the lower end portion of the hearth 13 and the ash pit 27. For reasons hereinafter disclosed a double row of air-inlet nozzles 42 and 43 is disposed in the arch-like portion 41 of the rear wall. These nozzles project between the tubes 15 and through the refractory material of the wall 14, opening into the space above the hearth 13. Each nozzle receives preheated combustion air from the duct 35 through a valved conduit 44 leading to a transverse manifold 45, and individual conduit connections 46. As shown, the nozzles 43 are advantageously provided with capped branch connections in alignment with the nozzles, so that upon need the nozzles may be cleaned by rodding or the like.

Since reflected heat is highly desirable in maintaining combustion conditions with a high moisture fuel, a refractory arch-like roof 47 is spaced above the upper end portion of the hearth 13. The roof extends from the edge of the fuel inlet 24, with a slight upward inclination, to a position horizontally spaced from the wall 14, with its upper edge defining one side of the outlet 16. As shown, a vertical projection of the roof 47 extends over a major portion of the inclined hearth 13. The roof may be supported in any suitable manner, for example, as shown schematically in Fig. 1, from a row of tubes 48 which extends in a direction generally parallel to the arch from a header 50 to a position adjacent the edge of the outlet 16. Thereafter the tubes 48 are bent into an upright plane and form part of a wall 51 which defines one side of a water cooled gas pass or secondary furnace 52. A row of air inlet nozzles 53 extends through the roof 47, opening into the furnace 10. These nozzles are supplied with a controlled flow of preheated combustion air from the duct 35 through a conduit 54, a manifold 55 and individual conduits 56 connected with each of the nozzles. The total quantity of air flow through the conduit 54 is regulated by a valve 57.

The gas pass or secondary furnace 52 is lined by the tubes 15 and 51 in opposite walls thereof, and in addition is provided with an upright row of tubes 58 extending upwardly from a header 60. A similar row of tubes and a header are positioned on the opposite wall of the secondary furnace 52. All of the tubes lining the walls of the secondary furnace are connected into the circulatory system of a boiler (not shown) which is arranged to receive the hot gases passing upwardly through the gas pass or secondary furnace 52.

Fuel may be burned in the secondary furnace 52 for any of several reasons, that is, additional heat may be desired in excess of that produced in the furnace 10 by the combustion of the high moisture fuel. Additional heat may be needed by reason of an insufficient supply of the high moisture fuel, or due to a steam requirement greater than can be produced by burning the high moisture fuel. In addition, when the moisture content of the fuel delivered to the hearth 13 is above an optimum maximum value, for example 65% to 68%, supplementary heat is required, i. e. the combustion of the high moisture fuel is not self-sustaining. Under such conditions, a relatively high heat content fuel is burned in the secondary furnace to assist, by radiant heat transfer, the combustion process of the high moisture fuel.

The high heat content fuel may be any gaseous or fluid fuel, such as natural gas, oil or pulverized coal. In the embodiment shown, oil burners 61 are positioned in the wall of the furnace 52. Each burner assembly includes a circular air register 62 having adjustable air vanes 63 mounted adjacent a circular burner port 64 formed in the upper refractory wall portion 65 of the wall 14. The tubes 15 adjacent the port 64 are dispaced in a well known manner to provide clearance for the burner assembly. The housing 66 encloses all of the burner ports 64, and is provided with a valved duct connection 67 with the preheated air supply duct 35.

In the operation of the furnace described the high moisture fuel delivered to the dead plate 23 is preheated by heat reflected from the walls of the furnace, and some of the moisture in the fuel is evaporated. As the fuel moves downwardly through the furnace the remaining portion of the moisture therein is removed by the air passing therethrough from the chamber 28A. The pressure of the air passing through the hearth from the chamber 28A is advantageously adjusted by the valve 33A to maintain a low partial pressure at the fuel surface. In the further movement of the fuel downwardly along the hearth 13, the volatile matter therein is distilled and burned above the fuel bed, and the fixed carbon is burned in situ in the lower portion of the furnace by the preheated air passed through the hearth from the chambers 28B, 28C and 28D.

The overfire air introduced through the nozzles 53 is particularly effective in mixing and burning the volatile matter distilled from the fuel in the upper portion of the furnace. The overfire air injected through the nozzles 42 and 43 is not only effective in aiding the mixing and combustion of volatiles in the lower end portion of the furnace and assisting in the combustion of the fixed carbon in the fuel bed, but also is effective in consuming any carbon residues in the ash moving over the refractory materials 26 toward the ash pit 27.

It will be noted that the arches 46 and 41 are positioned to reflect heat toward the hearth 13 and to thereby assist in the combustion of the wood refuse. When the burners 61 are in use the radiant heat therefrom is directed, in part, toward the hearth 13 and will be of assistance in maintaining suitable temperatures within the hearth furnace for efficient combustion of high moisture fuels. The rear wall 14 is protected by the tubes 15 against heat damage from the use of oil or other high heat value fuel in the secondary furnace.

While in accordance with the provision of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. Combustion apparatus comprising refractory walls defining the heat reflective sides of a furnace, a closely spaced row of fluid cooled tubes defining an inclined hearth in the lower portion of said furnace, means for introducing a controlled flow of combustion air upwardly between the tubes of said inclined hearth, means for delivering high moisture solid fuel to the upper end portion of said hearth, a fluid cooled tube extension of said hearth extending in a generally horizontal direction to an ash pit at the lower end of said furnace, a refractory arch spaced above and extending forwardly from said ash pit in a parallel direction to the upper end of said hearth tube extension, nozzles positioned in said arch for the introduction of overfire air into the lower end portion of said furnace, a refractory wall at the rear of said furnace merging with said arch and extended upwardly in a direction substantially perpendicular to the inclined tubes of said hearth, an arch-like refractory roof extending forwardly in a generally horizontal direction from a position spaced above the upper end portion of said hearth to a position transversely spaced from said rear wall to define a furnace gas outlet therebetween, a row of overfire air discharge nozzles projecting through said roof intermediate the length thereof, and burner means for delivering fluid fuel and combustion air to the furnace gas pass at a position upwardly spaced from said furnace outlet.

2. Combustion apparatus according to claim 1 wherein a row of fluid cooled tubes extends upwardly along the furnace face of said rear wall.

HENRY W. BEECHER.

References Cited in the file of this patent

UNITED STATES PATENTS

| Number | Name | Date |
|---|---|---|
| 1,437,182 | Jackson | Nov. 28, 1922 |
| 1,973,697 | Bailey | Sept. 18, 1934 |
| 1,973,705 | Hardgrove et al. | Sept. 18, 1934 |
| 2,057,450 | Schrenk | Oct. 13, 1936 |